Patented Dec. 2, 1924.

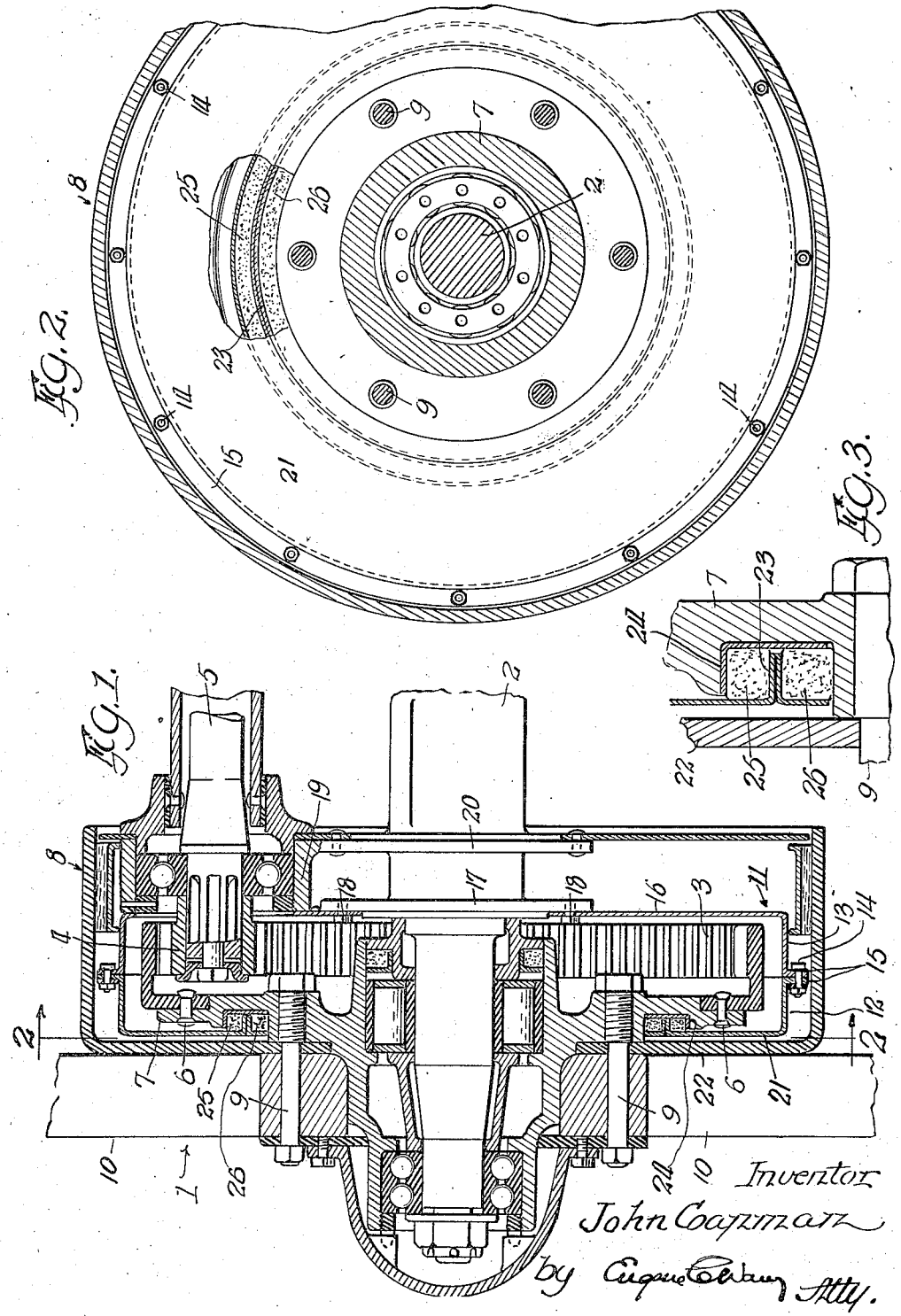

1,517,494

UNITED STATES PATENT OFFICE.

JOHN COAPMAN, OF DETROIT, MICHIGAN, ASSIGNOR TO RUSSEL MOTOR AXLE COMPANY, OF DETROIT, MICHIGAN, A CORPORATION OF MICHIGAN.

GEAR CASING FOR MOTOR-VEHICLE WHEELS.

Application filed November 13, 1920. Serial No. 423,808.

*To all whom it may concern:*

Be it known that I, JOHN COAPMAN, a citizen of the United States, residing at Detroit, in the county of Wayne and State of Michigan, have invented new and useful Improvements in Gear Casings for Motor-Vehicle Wheels, of which the following is a specification.

This invention relates to improvements in internal gear drives for wheels of motor vehicles, and has for its object to provide an oil or lubricant retaining casing for the internal gear of each wheel.

In the accompanying drawings—

Fig. 1 is a sectional view taken axially through the hub portion of a vehicle wheel of the kind mentioned and showing about the internal gear an oil or lubricant retaining casing constructed and mounted in accordance with my invention;

Fig. 2 is a transverse sectional view taken on line 2—2 of Fig. 1; and

Fig. 3 is an enlarged sectional view of a detail of construction to be hereinafter described.

In the drawings, 1 indicates one of the rear wheels of a motor vehicle, mounted on one end of a dead axle 2 and driven by an internal gear drive, which, as shown, comprises an internal gear 3 secured to and rotating with the wheel and having in mesh with it a pinion 4 fixed on the jack shaft 5, the latter being driven by the motor of the vehicle in a manner well known in this art. The internal gear 3 is secured by rivets 6, or by other means, to the hub portion 7 of the wheel, and the brake drum 8, which encircles these parts, is secured by bolts 9 to the hub portion 7 and the spokes 10 of the wheel, as shown in Fig. 1. These parts are on the inside of the wheel, and it is of course to be understood that there is a duplicate set of parts on and for the other wheel at the other end of the dead axle, thus enabling a description and showing of the set of parts for one wheel to be sufficient for both.

Located in the brake drum 8 and surrounding the internal gear 3, is an oil or lubricant retaining casing 11 constructed and mounted in accordance with my invention. As illustrated, this casing is annular in form and is made in two sections, a front section 12 and a rear section 13, each section being annular and the two when placed together forming the complete casing and secured together at their meeting edges by bolts 14 inserted through outwardly projecting marginal flanges 15 at the meeting edges of the sections. The side wall 16 of the inner section 13 constitutes a cover, so to speak, for the internal gear 3, and extends inward to the dead axle 2, and is there provided with an opening for the dead axle 2. The dead axle at this point has an outer radial flange or brake support 17 closing the opening through the wall 16 and preventing oil or other lubricant in the casing 11 from working out or escaping therefrom through said opening. The oil casing 11 is supported by said outer flange 17 by having its wall 16 secured thereto by screws 18 or other fastening means. As shown in Fig. 1, the wall 16 has another opening to allow the jack shaft 5 to extend therethrough into the casing 11, and this opening is surrounded by the annular portion 19 constituting a support for the bearing for the jack shaft 5; this portion 19 being a part of an inside flange 20 on the axle 2. Thus the jack-shaft 5 is supported by said flange 20. By the construction described, the dead axle 2 has inner and outer flanges 17, 20, with the oil casing 11 supported by one of said flanges and the jack-shaft 5 by the other. Also supported to the inner flange 20 is a dust plate 8ª which closes the inner open side of the brake drum 8.

The front section 12 has its side wall 21 extending inward between the adjacent wall 22 of the brake drum 8 and the hub portion 7. This wall 21 is made with an opening in its center to allow the hub portion 7 to extend through it. The wall 21 is provided about and adjacent its inner edge with a flange 23, (Fig. 3) which extends into an outwardly opening annular recess 24 provided in the adjacent face of the hub portion 7. In this recess are two rings 25, 26 of suitable material, such as cork, felt or the like, these rings substantially filling the recess to prevent the passage or escape of lubricant or oil from the casing 11 through the opening in the side wall 21 of its front section. As shown, these rings 25, 26 are superposed, with the flange 23 extending inward between them to hold them in the recess, as they are carried around with the wheel.

The casing 11 does not rotate with the wheel because it is secured to and supported by the non-rotating axle 2. The casing 11 surrounding and enclosing the internal gear 3, prevents either said gear or the pinion 4, or both, when rotated from splashing or throwing oil or lubricant on the brake drum or its brake band, and, further, saves the lubricant because it is prevented from escaping from the casing by the manner in which the casing is made and mounted. In addition to these novel features, the casing houses or retains the lubricant about the internal gear, thus causing those parts to run in a lubricant, and, further, prevents dirt, dust, sand, grit and other foreign matter, during the travel of the wheel over the roadway as well as at other times, from getting on the gear and pinion or in the lubricant in the casing. The casing 11 being made in two sections permits them to be readily made from sheet metal, and furthermore facilitates assembling the parts in the brake drum and about the internal gear, and, as the front section 12 is bolted to the rear one, the casing may be readily opened to inspect or repair the parts therein or to clean out the casing when the occasion demands.

While I have shown and described herein in detail an oil or lubricant retaining casing of my invention, it is to be of course understood that the details of construction and arrangement of parts illustrated may be variously changed and modified without departing from the spirit and scope of my invention.

I claim as my invention:

1. The combination with the dead axle of a motor vehicle and wheel thereon, of a lubricant retaining casing located adjacent the inside of said wheel, said axle extending through said casing, said wheel having a hub provided with a radial flange extending into said casing, the latter made in two annular sections secured together at their meeting edges, with the inner section secured to said axle to the rear of said flange and the outer section having its side wall in front of said flange, a ring of packing material set in the outer face of said flange and in contact with the side wall of the outer section, said wall having an inturned flange extending under and engaging said ring for holding the same in said flange, and power transmitting means in said casing for turning said wheel.

2. The combination with the dead axle of a motor vehicle and wheel thereon, of a lubricant retaining casing located adjacent the inside of said wheel, said axle extending through said casing, said wheel having a hub provided with a radial flange extending into said casing, the latter made in two annular sections secured together at their meeting edges, with the inner section secured to said axle, two rings of packing material set in the outer face of said flange and in contact with the side wall of the outer section of said casing, said wall having an inturned flange extending between and engaging said rings, and power transmitting means in said casing for turning said wheel.

3. In an assembly for the purpose specified, the combination of a dead axle, a traction wheel rotable on the dead axle, a brake drum bolted to the traction wheel, the dead axle being provided with outer and inner flanges, a jack shaft rotatably supported upon the inner flange, a two-section oil cup supported upon the outer flange, a driven gear in detachable driving relation with the traction wheel and supported in said oil cup, and a pinion on the end of the jack shaft in mesh with the driven gear.

4. In an assembly for the purpose specified, the combination of a dead axle, a traction wheel rotatably mounted thereon, inner and outer flanges carried by said dead axle, a gear member carried by said wheel, a jack shaft rotatably supported upon one of said flanges and having a pinion in mesh with said gear member, and an oil casing surrounding said gear member and supported by the other of said flanges.

5. In an assembly for the purpose specified, the combination of a dead axle, a traction wheel rotatably mounted thereon, inner and outer flanges carried by said dead axle, a gear member carried by said wheel, a jack shaft rotatably supported upon the inner flange and having a pinion in mesh with said gear member, and a two section oil casing surrounding said gear member and supported by said outer flange with the meeting edges of said sections surrounding the gear member and secured together.

6. In an assembly for the purpose specified, the combination of a dead axle, a traction wheel rotatably mounted thereon, inner and outer flanges carried by said dead axle, a jack shaft rotatably supported upon one of said flanges and having a pinion, a two section oil casing supported upon the other of said flanges, and a driven gear supported by said wheel in said oil casing and in mesh with said pinion.

7. In an assembly for the purpose specified, the combination of a dead axle, a traction wheel rotatably mounted thereon, inner and outer flanges carried by said dead axle, a gear member carried by said wheel, a jack shaft rotatably supported upon the inner flange and having a pinion in mesh with said gear member, and a two section oil casing surrounding said gear member with the inner section secured to the outer flange and covering the gear member on the inside, and the outer section secured to the inner section and covering the gear member on the outside.

8. In an assembly of the character described, the combination of a dead axle, a traction wheel rotatably mounted thereon, inner and outer flanges carried by said axle inside of said wheel, a gear member carried by said wheel on the inside thereof, a jack-shaft rotatably supported upon said inner flange and having a pinion in mesh with said gear member, an oil casing having connected front and rear sections surrounding said gear member and supported by said outer flange by having the rear section secured thereto, and means carried by the casing and wheel, respectively, to provide a joint between the same preventing the escape of lubricant from said casing.

9. In an assembly of the character described, the combination of a dead axle, a traction wheel rotatably mounted thereon, inner and outer flanges carried by said axle inside of said wheel, a gear member carried by said wheel on the inside thereof, a jack-shaft rotatably supported upon said inner flange and having a pinion in mesh with said gear member, an oil casing surrounding said gear member and supported by said outer flange, a brake drum having an open inner side surrounding said casing and carried by said wheel, and a dust plate closing the open side of said drum and supported by said inner flange.

10. In an assembly of the character described, the combination of a dead axle, a traction wheel rotatably mounted thereon, said wheel having a hub portion provided with a radial flange, a gear member encircling said hub portion and carried by said flange, a lubricant retaining casing surrounding said gear member and flange and made of inner and outer annular sections secured together at their meeting edges, said inner section being secured to said axle at the rear of said flange and the outer section having the side wall in front of said flange and extending toward said hub portion, a packing ring set in the outer face of said flange between said hub portion and said gear member and engaging the side wall of said outer section, said wall holding said ring in said flange, and a jack-shaft rotatably supported by said axle and having a gear pinion in said casing in mesh with said gear member for turning the same.

11. In an assembly of the character described, the combination of a dead axle, a traction wheel rotatably mounted thereon, said wheel having a hub portion provided with a radial flange, a gear member encircling said hub portion and carried by said flange, a lubricant retaining casing surrounding said gear member and flange and made of inner and outer annular sections secured together at their meeting edges, said inner section being secured to said axle at the rear of said flange and the outer section having the side wall in front of said flange and extending toward said hub portion, a packing ring set in the outer face of said flange between said hub portion and said gear member and engaging the side wall of said outer section, said wall holding said ring in said flange, a jack-shaft rotatably supported by said axle and having a gear pinion in said casing in mesh with said gear member for turning the same, and a brake drum surrounding said casing and having a flange extending inward between said wheel flange and wheel and secured to the hub portion thereof inward from said packing ring.

12. In an assembly of the character described, the combination of a dead axle, a traction wheel rotatably mounted thereon, said wheel having a hub portion provided with a radial flange, a gear member encircling said hub portion and carried by said flange, said axle having inner and outer flanges inside of said hub portion, a lubricant retaining casing surrounding said gear member and flange and made of inner and outer annular sections secured together at their meeting edges, said inner section being secured to the outer flange of said axle, the outer section of said casing having its side wall in front of said wheel flange and extending toward the hub thereof, a packing ring set in the outer face of said wheel flange between said hub portion and gear member and engaging the side wall of said outer section, said wall holding said ring in said flange, a jack-shaft rotatably supported by the inner flange on said axle and having a gear pinion in said casing in mesh with said gear member, a brake drum surrounding said casing and having a flange extending inward between said wheel flange and wheel and secured to said hub portion, and a dust plate closing the open inner side of said drum and secured to the inner flange on said axle.

In testimony that I claim the foregoing as my invention, I affix my signature, this 10th day of November, A. D. 1920.

J. COAPMAN.